United States Patent [19]

Garvey et al.

[11] Patent Number: 4,778,667
[45] Date of Patent: Oct. 18, 1988

[54] SPHEROIDAL SILICA

[75] Inventors: Michael J. Garvey; Ian C. Griffiths, both of Wirral, England

[73] Assignee: Unilever Patent Holdings B.V., Rotterdam, Netherlands

[21] Appl. No.: 937,112

[22] Filed: Dec. 2, 1986

[30] Foreign Application Priority Data

Dec. 5, 1985 [GB] United Kingdom ................ 8529970

[51] Int. Cl.$^4$ .............................................. C01B 33/12
[52] U.S. Cl. .................................... 423/335; 423/338; 423/339
[58] Field of Search ........................ 423/338, 339, 335

[56] References Cited

U.S. PATENT DOCUMENTS 4,255,286 3/1981 Berek et al. ........................ 423/338

FOREIGN PATENT DOCUMENTS

| 1529058 | 6/1968 | France ............................... 423/339 |
| 74253 | 7/1970 | German Democratic Rep. .................................... 423/339 |
| 1433242 | 4/1976 | United Kingdom ................ 423/345 |
| 1506114 | 7/1976 | United Kingdom ................ 423/345 |
| 1452896 | 10/1976 | United Kingdom ................ 423/345 |
| 2127002 | 7/1983 | United Kingdom ................ 423/345 |

OTHER PUBLICATIONS

Chemical Abstracts, vol. 106, No. 22, Jun. 1, 1987, 179066h Structured Silicas.

Primary Examiner—John Doll
Assistant Examiner—Lori S. Freeman
Attorney, Agent, or Firm—Cushman, Darby & Cushman

[57] ABSTRACT

This invention relates to novel silica spheroids and to their production by a phase separation technique in which an aqueous alkaline stabilized silica sol and an aqueous solution of a non-adsorbing polymer are mixed and acidified to produce the new silica spheroids.

6 Claims, 2 Drawing Sheets

SPHEROIDAL SILICA

This invention relates to the formation of spheroidal silica aggregates. More particularly the invention discloses novel spheroidal silica aggregates and a process for the production of such silica aggregates.

The spheroidal silica aggregates with which this invention is concerned are generally rounded particles in the micron size range, for example in the range 1 to 400 microns.

A common route for preparation of silica aggregates is by emulsification of silica sols in an oil phase and subsequent aggregation or gelation of the silica within the droplets of the emulsion by the addition of acid to form the silica spheroids or aggregates. The emulsification route is described, for example, in GB No. 2 127 002A (Toyo Soda Manufacturing Company Limited) and GB No. 1 452 896 (NRDC). Silica spheroids formed by the emulsification route require extensive cleaning procedures to remove oil and emulsifier and lead to large volumes of waste solvent. Such cleaning is particularly important when these silica spheroids are to be used in applications such as analytical chromatographic supports.

Another route for formation of silica spheroids is described in GB No. 1 433 242 (E I Du Pont de Nemours & Company). This process comprises mixing a silica sol with a polymerisable organic material, i.e. formaldehyde and urea or melamine and initiating polymerisation of the organic material to cause coacervation of the organic material and colloidal silica into microspheres. The organic material is subsequently burned off. According to GB No. 1 506 114 and GB No. 1 433 242 (E I Du Pont de Nemours & Company) the resulting particles are extremely fragile with a pore volume of greater than 50% by volume.

This invention provides a porous spheroidal silica having a particle size in the range 1–400 microns, axial ratios of 1:1 to 1:12, a pore volume in the range 26 to 50% and a narrow pore size distribution in which more than 80% of the porosity is between 50 and 200% of the median pore diameter in the pore size range 20 to 1000 Å.

In a preferred form of the invention the particle size range is between 1 and 200 microns and the axial ratios from 1:1 to 1:4.

Accordingly, the present invention provides a process for the preparation of the novel silica spheroids comprising mixing together under alkaline conditions an aqueous alkali stabilised silica sol and an aqueous solution of a non-adsorbing polymer to form a phase separated system comprising silica droplets in a polymer rich continuous aqueous phase and acidifying the system to aggregate the droplets to form the silica spheroids.

Normally, in the close-packed structures forming the spheroidal silica particles, the median pore diameter is less than the average constituent particle diameter. This applies when the silica sol, which generates the constituent particles, has a monomodal size distribution.

Preferably the sol and polymer solutions are mixed at a pH in the range 8.5–10.5.

The silica rich dispersed phase units are typically of the order of tenths of one micron in size. Surprisingly, however, on addition of acid to accelerate aggregation of the silica within the dispersed phase units, coalescence of the units into larger dispersed phase units occurs. The simultaneous aggregation within the coalescing dispersed phase results in the formation of silica spheroids generally of greater than one micron in diameter.

Silica sols useful in this invention are typified by Ludox HS 40 (E I Du Pont de Nemours & Co) and the preparation of such sols is described in, for example, U.S. Pat. No. 2,801,902. Such sols can have a concentration between ½% up to 55% by weight silica. In general, sol particle sizes of up to about 1000 Å may be used.

Non-adsorbing polymers useful in this invention are typically organic polymers, such as negatively charged polyelectrolytes including, for example, sodium dextran sulphate, sodium polyacrylate, sodium carboxymethyl cellulose and mixtures of such polyelectrolytes. It is essential if phase separation is to achieved that the polymer is not adsorbed by silica at the pH of the system.

A preferred polymer concentration to induce phase separation is in the region 0.01–20% by weight in the mixture. The concentration of polymer is in addition related to the concentration of silica and the ionic type and concentration of electrolytes in the system. For example some electrolytes may be present in the original silica sol to control its stability.

The most preferred concentration cannot be expressed simply, since this is a complex function of the polymer type, charge and flexibility, the electrolyte type and concentration and the silica sol type and concentration. The most preferred concentration, however, can be obtained by the following procedure which, in addition, serves as a test procedure for selecting suitable polymers for the invention.

A polymer type and concentration is selected by preparing an aqueous polymer solution in the region of up to 20% w/w and adding this slowly to a silica sol in the concentration region of 20% w/w at an approximate pH 9, until the mixture just becomes appreciably more turbid. The mixture is allowed to mix thoroughly. If the turbidity decreases appreciably, more polymer is added until the mixture remains turbid after thorough mixing. The polymer concentration in the mixture would be in the region of 0.1 to 10% w/w and typically in the region 1 to 5% w/w based on the mixture. The phase separation state is confirmed by addition of an equal volume of water to the mixture which results in a dramatic decrease in turbidity, back to that of the order of the original silica sol.

Higher polymer concentrations can be used, as long as reversibility is observed on dilution to below the above-determined concentration of polymer.

Unsuitable polymer types, levels or molecular weights will not result in the above reversible phase separation. For example, no apparent increase in turbidity would be observed with silica sol compatible polymers such as nonionic dextran.

Undesirable irreversible turbidity would be due to aggregation rather than phase separation and may be caused by:
(i) excessive polyelectrolyte or electrolyte;
(ii) adsorbing rather than non-adsorbing polymers, e.g. cationic polyelectrolytes.

The above process of phase separation is discussed in "Polymeric Stabilisation of Colloidal Dispersions" by Donald H Napper, Academic Press 1983, and is understood to occur by a depletion flocculation mechanism. Phase separation is, therefore, more readily achieved with polymers of high molecular weight and high anionic charge density.

Certain anionic polymers such as xanthan gum, of very high molecular weight, will induce phase separation but because of their gelling characteristics are difficult to handle and are, therefore, less desirable than, for example, sodium dextran sulphate.

The process of aggregation or gelation of the silica droplets is initiated by the addition to the system of a mineral acid such as sulphuric or hydrochloric acid, although other acid may also be used. The amount of acid required to induce the gelation or aggregation is that required to reduce the pH of the mixture to below that of the stable silica sol generally to within the range pH 4–8.5, preferably in the range pH 5–8. A further reduction in pH may be desirable to enhance the recovery of the spheroids from the polymer solution to as low as pH 2. The various pH reductions required in the process affect the final state of the silica spheroids and, as will be seen in the examples, significant time spans are involved and stepwise additions of acid are preferred.

The silica spheroids prepared according to the present invention generally have the size in the range 1–400 microns, preferably in the range 1–200 microns. Sub-micron aggregates may be present as unwanted material at the end of the process.

It will be appreciated that the silica spheroids formed according to the present invention avoid the problem of oil contamination inherent in the earlier processes and the plant and equipment used in their preparation avoids the use of inflammable oil phases, hence can be more simple and not essentially flameproof.

BRIEF DESCRIPTION OF THE DRAWINGS

In the accompanying drawings

EXAMPLE 1

Figure 1:
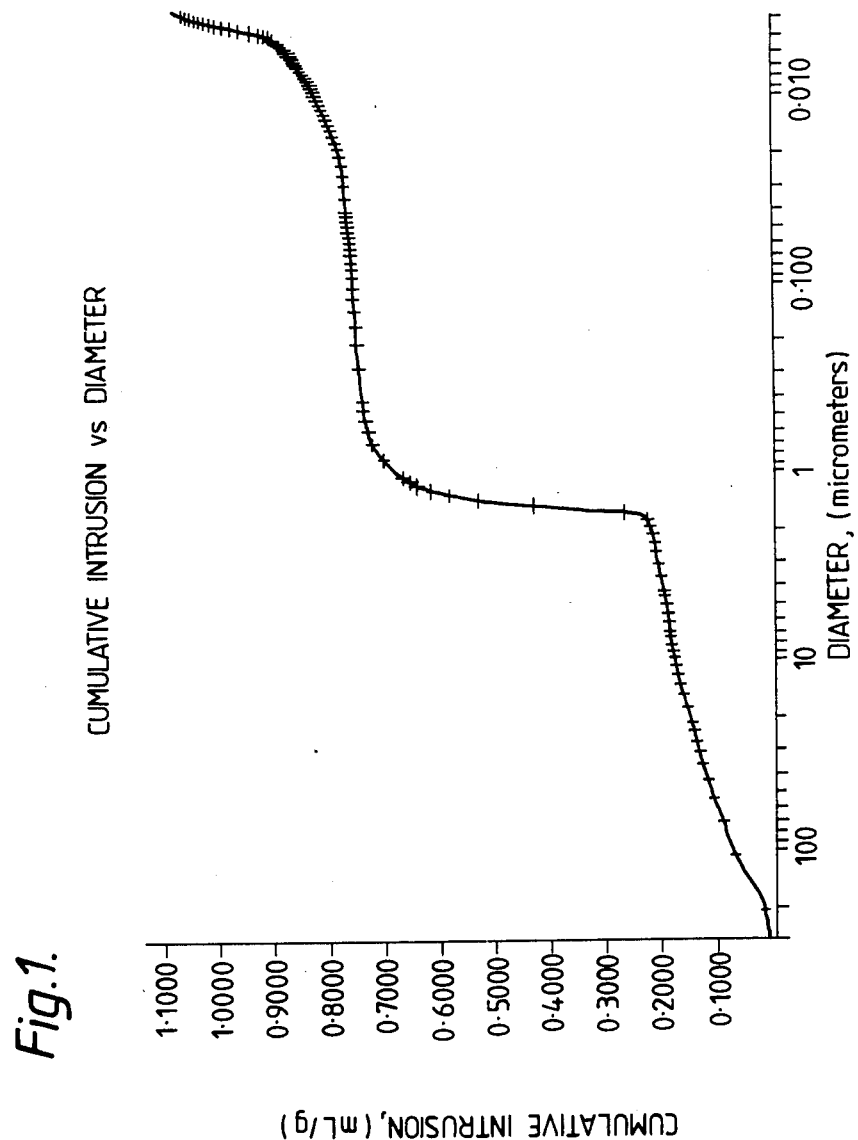
FIG. 1 is a typical mercury porosimetry diagram produced from a sample of the product of Example 9 and FIGS. 2 and 3 are scanning electron micrographs of the product of Example 9.

An aqueous dispersion containing 15% w/w $SiO_2$ (Ludox HS 40) and 2% w/w sodium polyacrylate (MW 230,000) at pH 9.6 was prepared and maintained gently stirring for three days. The sample appeared turbid and under an optical microscope contained sub-micron agglomerates. On dilution with water, the sub-micron units disappeared with a noticeable decrease in turbidity.

On reduction of the pH by addition of concentrated hydrochloric acid to pH 8.8 and maintaining stirring for one day there was no apparent difference in the above behaviour.

However, on further addition of acid to pH 7.0, markedly larger spheroids of up to 20 microns in size were formed in the dispersion. On dilution, the spheroids did not disrupt and there was no noticeable decrease in turbidity.

Examination of the silica by scanning electron microscopy showed the presence of smooth surface silica spheroids. Examination by transmission electron microscopy showed the material to be composed of densely packed colloidal silica.

EXAMPLE 2

A 20% w/w silica dispersion was prepared by dilution of Ludox HS 40 with distilled water. This was added to an equal volume of 4% w/w solution of sodium polyacrylate at pH 9.6 prepared by addition of concentrated sodium hydroxide to a solution of polyacrylic acid (approx. M.W. 230,000). The dispersion was rapidly stirred and the pH rapidly adjusted to 7.4 by addition of concentrated sulphuric acid. Large silica spheroids of up to approximately 30 microns were formed. Several particles were elongated in shape which was interpreted as due to the rapid shear in the system.

EXAMPLE 3

Equal volumes of a 30% silica sol (Ludox HS 40) and a 4% sodium polyacrylate (MW 230,000) solution pH 9.6 was stirred gently and the pH lowered rapidly to pH 5.6 by addition of concentrated hydrochloric acid. While large aggregates of the order of 10 microns were formed, the aggregates were not as effectively coalesced as those of Example 1 and 2. This is probably a consequence of the lower pH greatly accelerating aggregation of the sub-micron units so that coalescence is somewhat impaired. On repeating the Example, but adding a lower concentration of hydrochloric acid more slowly to pH 6.8, coalesced silica spheroids were produced.

EXAMPLE 4

A 53 g mixture at pH 9.8 containing 3.8% w/w sodium dextran sulphate (Pharmacia $M_w$ $5\times 10^5$) and 20.9% w/w $SiO_2$ (Ludox HS40 E I Du Pont de Nemours) was thoroughly mixed on a Silverson mixer on maximum power for one minute. Examination of the turbid mixture by optical microscopy showed the presence of indistinguishable sub-micron units. The pH of the mixture was reduced to pH 7.8 with concentrated hydrochloric acid and left stirring (magnetic stirrer) for 16 hours, then reduced to pH 6.9 and left stirring for 72 hours. Optical microscopy showed the presence of polydisperse spheroids up to approximately 50 $\mu$m.

EXAMPLE 5

An approximate repeat of Example 4 in the presence of 0.6% w/w NaCl was carried out as follows.

A 50 g mixture at pH 9.6 containing 3.8% w/w sodium dextran sulphate, 20.9% w/w $SiO_2$ and 0.6% w/w NaCl, based on the total weight of the mixture was mixed on a Silverson mixer as above. The sample was more translucent than that for Example 4. The sample was stirred at pH 9.6 for 1½ hours, reduced to pH 7.8 and stirred for 24 hours. The mixture was now turbid. The pH was dropped to pH 6.9 and left stirring for 24 hours to produce a turbid dispersion containing silica spheroids up to approximately 40 $\mu$m.

EXAMPLE 6

An approximate repeat of Example 5 in the presence of 5.0% w/w polymer was carried out as follows.

A 50 g mixture at pH 9.6 containing 5.0 w/w sodium dextran sulphate, 20.9% w/w $SiO_2$ and 0.6% w/w NaCl, based on the total volume of the mixture, was mixed on a Silverson mixer for one minute followed by stirring for 1½ hours.

The resulting dispersion remained turbid. The pH was reduced to pH 7.7 and the mixture stirred for 24 hours. The pH was then reduced to pH 6.9 and left stirring for a further 24 hours to produce a dispersion containing silica spheroids up to approximately 100 $\mu$m in size.

EXAMPLE 7

A 900 cm$^3$ dispersion containing 2.6% w/w sodium polyacrylate (prepared by neutralising a 2.0% w/w polyacrylic acid (MW 230,000) solution with concentrated sodium hydroxide) and 15.8% w/w SiO$_2$ (Ludox HS40) at pH 9.8, was mixed on a Silverson mixer for 5 minutes then left undisturbed for a period of two weeks.

The pH of the mixture was reduced to pH 7.4 and gently stirred at 120 rpm (stirrer motor with paddle blade stirrer) for one day then reduced to pH 7.1 and continued stirring for a further day to allow the silica spheroids to harden.

Examination by optical microscopy showed the particles to be predominantly in the region of 5 to 10 μm with no visible fine material. The particles were, however, irregularly shaped. This shape difference is believed to be due to the slow aggregation at pH 9.8 in the absence of a shear field.

An additional 700 g of silica sol (Ludox HS40 42% w/w silica) was added slowly over a twenty day period to the above dispersion with continuous stirring at 120 rpm and maintaining the pH at approximately pH 7.7.

The pH was finally adjusted to 7.0 for a further 24 hours then adjusted to pH 4.0 and allowed to settle for 48 hours. Examination of the particles by electron microscopy showed that the particles had grown to a smoother, more spheroidal geometry with larger particles up to approximately 50 μm together with finer material in the region of down to approximately 1 μm.

The supernatant was removed and the sediment redispersed into water and allowed to settle for a period of four days. This operation was repeated five times and then the sediment was freeze-dried.

Examination of the spheroids by mercury porosimetry showed a porosity of 0.38 cm$^3$g$^{-1}$ between 30 and 1000 Å with the majority, 0.3 cm$^3$g$^{-1}$, between 30 and 100 Å.

EXAMPLE 8

Two 4 liter silica sol and sodium polyacrylate dispersions were mixed in the same proportions as in Example 7. One sample (a), was stirred at 300 rpm whereas a second sample (b) was mixed on a Silverson mixer and then allowed to stir at 300 rpm in a 5 liter round bottom flask.

After 2 days at pH 9.7 sample (a) contained smooth spheroidal entities up to approximately 100 μm whereas sample (b) contained indistinguishable sub-micron entities. No change occurred on continuous stirring for 16 days.

The pH of the dispersions was reduced to pH 7.8 for one day then to pH 7.2 for a further day while maintaining stirring.

Examination by optical microscopy showed smooth spheroids up to approximately 200 μm for sample (a) and up to approximately 5 μm for sample (b).

Sample (a) was allowed to settle and was redispersed several times in distilled water then the sediment was freeze-dried. The material was heated to 555° C. for two hours then examined by mercury porosimetry. The material had a porosity of 0.32 cm$^3$g$^{-1}$ with the majority, 0.28 cm$^3$g$^{-1}$, between 30 and 100 Å.

EXAMPLE 9

A 4 liter dispersion was mixed in the same proportions as in Example 7. The dispersion was mixed on a Silverson mixer at maximum power for three minutes then transferred to a 5 liter round bottom flask and stirred for 4 hours at 400 rpm at pH 9.8.

The pH was reduced to 7.85 and stirring continued for 24 hours. Examination by optical microscopy showed the appearance of spheroidal entities in the 3 μm region with a few larger, approximately 10 μm, entities.

The dispersion was stirred for 2 days then the pH reduced to pH 7 and stirred for a further one day.

The pH of the dispersion was reduced to pH 2 in order to reduce the viscosity of the continuous phase, allowed to settle for 4 days, decanted and the sediment redispersed into water at pH 2. This was repeated a further five times, the final three redispersions being into water at neutral pH. The sediment was then freeze-dried.

Figure 2:
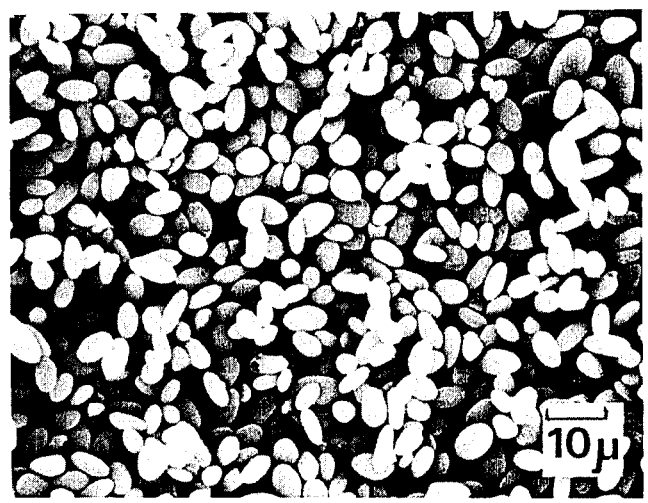
Figure 3:
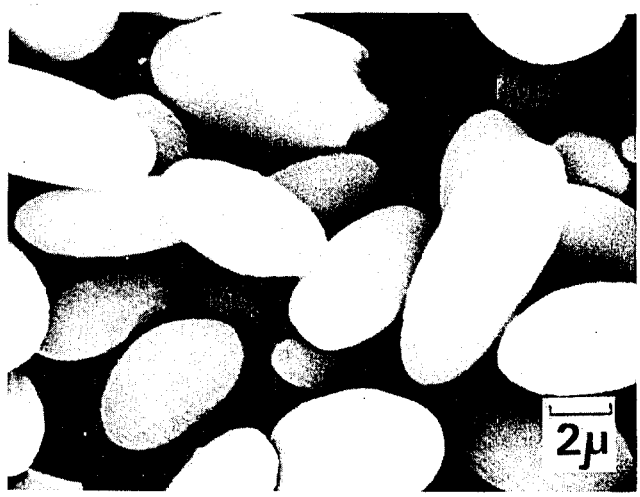

A total of 320 g material was recovered. The sample was fractionated using an air classifier into a fraction 70% between 3.8 and 6.2 μm. The material was heated at 500° C. for two hours and examined by mercury porosimetry. The results shown in FIG. 1 show the interparticle voids in the region of 2 μm and the particle porosity of 0.3 cm$^3$g$^{-1}$ at less than 1000 Å with a mean pore diameter of approximately 40 Å. SEM examination of the material showed the smooth surface character as shown in FIGS. 2 and 3.

EXAMPLE 10

A 25 g dispersion containing 2.4% w/w Courlose F75P (MW approx 100,000 SCMC) and 8.4% w/w SiO$_2$ (Ludox HS40) was mixed at pH 9.8 for two minutes on a Silverson mixer followed by two minutes on a soniprobe. The pH was reduced to 7.8 for two hours then to pH 7.2 for one hour with continuous stirring using a magnetic stirrer. The pH was then reduced to pH 6.9 and left stirring for 24 hours. On dilution with water the silica spheroids were still somewhat reversible, swelling and dispersing on examination by optical microscopy. After a further 120 hours, irreversible spheroids up to approximately 70 μm were formed.

EXAMPLE 11

A 62.7 g dispersion was prepared as in Example 10 except the pH was immediately reduced to pH 5.1 and left stirring for six days. Spheroidal silica up to 30 μm with a large number of particles less than 2 μm were formed which did not redisperse on dilution with water.

EXAMPLE 12

A 75.5 g dispersion at pH 9.6 was prepared containing 2.4% w/w Courlose F8P (MW approx 30,000 SCMC) and 8.3% w/w SiO$_2$ (Ludox HS40). The dispersion was mixed on a Silverson mixer for 2 minutes followed by sonication for 4 minutes.

The pH was dropped to 7.8 for 2 hours then to 7.2 for 2 hours with continuous stirring on a magnetic stirrer.

The pH was then reduced to 7.0 ad allowed to stir for 4 days. Spheroidal particles up to approximately 20 μm were produced together with a background of sub-micron entities. The aggregation was irreversible on dilution with water.

EXAMPLE 13

A dispersion (500 g) was prepared containing 4.0% w/w sodium dextran sulphate (BDH, 500,000 mol wt) and 20.6% w/w wilica (Ludox HS40) at pH 9.4 and maintained dispersed by stirring. After 4 hours the pH was reduced to 7.9 and after a further 72 the pH was reduced to 7.0. After a further 16 hours stirring was stopped and the dispersion allowed to settle for 24 hours. The sediment was recovered, washed (three times) by dispersing in distilled water and leaving to settle for 24 hours and then freeze dried.

Microscopic examination of the freeze dried solid shows it to consist of prolate ellipsoids of size up to 70 microns with axial ratios ranging from 1:1 to 1:6.

The freeze dried material was divided into three portions which were calcined at 400°, 600° and 800° C. respectively for 2 hours. The samples were then examined by mercury porosimetry.

Calcining at 400° C. produced a material with a porosity of 0.39 $cm^3g^{-1}$ between 40 and 1000 Å, the majority, 0.34 $cm^{-1}$, between 40 and 100 Å.

Calcining at 600° C. produced a material with a porosity of 0.37 $cm^3g^{-1}$, between 40 and 1000 Å, with the majority, 0.34 $cm^3g^{-1}$, between 40 and 100 Å.

Calcining at 800° C. produced a material with a porosity of 0.33 $cm^3g^{-1}$, between 40 and 1000 Å with the majority, 0.32 $cm^3g^{-1}$, between 40 and 250 Å.

EXAMPLE 14

A dispersion (426 g) was prepared containing 5.8% w/w sodium dextran sulphate (BDH, 500,000 mol wt) and 20% w/w silica (Ludox HS40) at pH 9.6 and maintained dispersed by stirring. After 4 hours the pH was reduced to 7.9, and after a further 48 hours readjusted to 7.8. After a further 72 hours the pH was reduced to 6.8 and after a further 72 hours the stirring was stopped and the dispersion was allowed to settle for 24 hours. The sediment was recovered, washed (three times) by dispersing in distilled water and leaving to settle for 24 hours and freeze dried.

The resulting solid was sieved and the fraction >106 μm was collected, calcined (585° C., 2 hours) and examined by mercury porosimetry. The result shows that the material has a porosity of 0.30 $cm^3g^{-1}$ between 40 and 1000 Å with the majority, 0.27 $cm^3g^{-1}$, between 40 and 100 Å.

EXAMPLE 15

A dispersion (300 g) was prepared containing 4.0% w/w sodium dextran sulphate (BDH, 500,000 ml wt) and 20.6% silica (Ludox HS40) at pH 9.6 and maintained dispersed by stirring. After 2 hours the pH was reduced to 7.0. After a further 16 hours the pH was readjusted to 7.0, stirring was stopped, and the sample was diluted with distilled water (approx 300 g) and allowed to settle for 72 hours. The sediment was recovered, washed (three times) by redispersing in distilled water and leaving to settle for 24 hours and freeze dried.

The resulting solid was sieved and the fraction >53 μm was calcined (585° C., 2 hours) and examined by mercury porosimetry. The results show that the material has a porosity of 0.37 $cm^3g^{-1}$ between 40 and 1000 Å, with the majority, 0.34 $cm^3g^{-1}$, between 40 and 100 Å.

EXAMPLE 16

A dispersion (500 g) was prepared containing 2.0% w/w sodium carboxy methyl cellulose (Courtaulds, Courlose F8P, approx 30,000 mol wt) and 16.5% w/w silica (Ludox HS40) at pH 9.7 and maintained dispersed by stirring. After 1 hour the pH was reduced to 7.8 and then to 6.8 after a further 2 hours. The dispersion was stirred at this pH for 72 hours, then diluted to approx 1200 $cm^3$ with distilled water and allowed to settle. After settling for 24 hours the sediment was recovered, washed (twice) by dispersing in distilled water and settling for 24 hours, and freeze dried.

Microscopic examination of the material showed it to consist of prolate ellipsoids of size up to approx 130 microns with axial ratios of 1:1.1 to 1:7.

The resulting solid was sieved and the fraction >53 microns >106 microns was calcined (585° C., 2 hours) and examined by mercury porosimetry. The results show that the material has a porosity of 0.43 $cm^3g^{-1}$ between 40 and 1000 Å with the majority, 0.38 $cm^3g^{-1}$, between 40 and 100 Å.

EXAMPLE 17

A dispersion (300 g) was prepared containing 4.3% w/w sodium dextran sulphate (BDH, 500,000 mol wt) and 19.6% w/w silica (Ludox SM) at pH 10.1 and maintained dispersed by gentle stirring. After 3 hours the pH was reduced to 7.8 and then to 6.9 after 48 hours. After a further 24 hours stirring was stopped and the dispersion diluted with distilled water (approx 200 $cm^3$) and allowed to settle for 72 hours. The sediment was then recovered, washed (five times) by dispersing in distilled water and settling for a minimum of 24 hours, and freeze dried.

Microscopic examination of the freeze dried solid showed it to consist of prolate ellipsoids of size up to approximately 75 microns with axial ratios of 1:1.5 to 1:6.

The freeze dried solid was calcined (585° C., 2 hours), examined by mercury porosimetry and shown to have a porosity of 0.47 $cm^3g^{-1}$ for pores between 40 and 1000 Å, with the majority, 0.42 $cm^3g^{-1}$, between 40 and 100 Å.

EXAMPLE 18

Equal weights (150 g) of a 30.8% w/w silica dispersion (Ludox TM) and a 4.0% w/w polyacrylic acid solution (mol wt 230,000, pH 9.7) were mixed and gently stirred. After 5 hours the pH of the system was reduced from 9.0 to 7.8, then to 7.5 after 24 hours, 7.2 after 30 hours and 6.8 after 48 hours. After a further 5 days the pH had dropped to 6.3, the stirring was stopped and the dispersion allowed to settle. After 24 hours the sediment was recovered, washed (three times) by dispersing in distilled water and leaving to settle for 24 hours, and freeze dried.

The freeze dried solid was calcined (585° C., 2 hours), examined by mercury porosimetry and found to have a porosity of 0.26 $cm^3g^{-1}$ for pores between 40 and 1000 Å, with the majority, 0.22 $cm^3g^{-1}$, between 40 and 100 Å.

We claim:

1. A process for the preparation of silica spheroids comprising mixing together under alkaline conditions an aqueous alkali stabilised silica sol and an aqueous solution of a non-adsorbing polymer to form a phase separated system comprising silica droplets in a polymer rich continuous aqueous phase and acidifying the system to aggregate the droplets to form the silica spheroids.

2. A process as claimed in claim 1 in which the sol and polymer solutions are mixed at a pH in the range 8.5–10.5.

3. A process as claimed in claim 1, in which the pH reductions required in the process are carried out in a stepwide manner.

4. A process as claimed in claim 1, in which the non-absorbing polymer is selected from sodium dextran sulphate, sodium polyacrylate, sodium carboxymethyl cellulose and mixtures of such polyelectrolytes.

5. A process as claimed in claim 1 in which the polymer concentration to induce phase separation is 0.01 to 20% by weight in the mixture.

6. A process as claimed in claim 1 in which the acidification of the system is carried out to the pH range 4 to 8.5.

* * * * *